United States Patent
Temkin et al.

(10) Patent No.: US 6,580,864 B1
(45) Date of Patent: Jun. 17, 2003

(54) BIREFRINGENCE FREE OPTICAL WAVEGUIDE STRUCTURES

(75) Inventors: Henryk Temkin, Lubbock, TX (US); Rudolf Feodor Kazarinov, Lubbock, TX (US)

(73) Assignee: Applied WDM, Inc., Lubbock, TX (US)

( * ) Notice: Subject to any disclaimer, the term of this patent is extended or adjusted under 35 U.S.C. 154(b) by 0 days.

(21) Appl. No.: 10/047,779

(22) Filed: Jan. 14, 2002

(51) Int. Cl.$^7$ .............................. G02B 6/10; G02B 6/00
(52) U.S. Cl. ...................... 385/132; 385/129; 385/130; 385/141; 385/142; 385/144
(58) Field of Search ................................ 385/129–132, 385/141–145

(56) References Cited

U.S. PATENT DOCUMENTS

| | | | | |
|---|---|---|---|---|
| 4,002,512 A | * | 1/1977 | Lim | 385/141 |
| 5,202,938 A | * | 4/1993 | Man et al. | 359/494 |
| 5,502,779 A | * | 3/1996 | Magel | 385/1 |
| 5,506,925 A | | 4/1996 | Greene | 385/129 |
| 5,732,179 A | * | 3/1998 | Caneau et al. | 385/131 |
| 5,930,439 A | * | 7/1999 | Ojha et al. | 385/129 |
| 6,339,667 B1 | * | 1/2002 | Song et al. | 385/129 |
| 6,389,209 B1 | * | 5/2002 | Suhir | 385/129 |
| 6,396,988 B1 | * | 5/2002 | Shimoda | 385/129 |
| 2002/0025133 A1 | * | 9/2001 | Nara et al. | 385/129 |
| 2001/0045613 A1 | * | 11/2001 | Nagata | 257/510 |
| 2002/0039474 A1 | * | 4/2002 | Klekamp et al. | 385/129 |

OTHER PUBLICATIONS

"Chemical Vapor Deposition of Amorphous and Polycrystalline Thin Films," Coulson, Andrew R. et al., Silicon Processing for the VLSI Era Vol. 1–Process Technology, title p., pp. 161–196. (No Date).

"Refractive–index Dispersion of Phosphosilicate Glass, Thermal, Oxide, and Silicon Nitride Films on Silicon," Lee, H.J. et al., Applied Optics vol. 27, No. 19, Oct. 1988, pp. 4104–4109.

"13.7 Plasma–Enhanced CVD Dielectrics""Campbell, Stephen A., The Science and Engineering of Microelectronic Fabrication (second edition)," Oxford University Press 2001, title pg., copyright pg., p. 343.

"Integrated Optic Adiabatic Devices on Silicon," Shani, Yosi et al., IEEE 1991, pp. 556–566.

* cited by examiner

Primary Examiner—John D. Lee
Assistant Examiner—Tina M Lin

(57) ABSTRACT

An optical waveguide structure comprising an annealed phosphorous doped silicon dioxide core surrounded by silicon dioxide cladding layers on a silicon substrate. The refractive index of the core exceeds the refractive index of the cladding to enable waveguiding of optical signals in the core. The upper cladding layer, and in one embodiment also the lower cladding, comprises high boron and phosphorous doped silicon dioxide, suitably doped with greater than about 9% of boron and with about 2.5% to 3.5% phosphorous to obtain a thermal coefficient of expansion approximating that of the silicon substrate. In an alternative embodiment, the lower cladding layer comprises thermally grown silicon dioxide, preferably including an upstanding pedestal on which the waveguide core extends. Advantageously, the cladding composition enables substantially compensation of compressive stress in the core by residual tensile strain in the cladding, thereby reducing to very low values birefringence induced optical signal shift between TE and TM modes of propagation of an optical signal.

23 Claims, 4 Drawing Sheets

BIREFRINGENCE FREE OPTICAL WAVEGUIDE STRUCTURES

CROSS-REFERENCE TO RELATED APPLICATIONS

This application is related to application Ser. No. 10/047,780 filed on the same date as this application by Henryk Temkin and Rudolf F. Kazarinov, entitled Optical Waveguide Structures and Methods of Fabrication, also assigned to Applied WDM, Inc., the disclosure of which is hereby incorporated by reference in the present application.

BACKGROUND OF INVENTION

This invention relates to solid state optical waveguide structures.

Optical waveguide structures based on silicon dioxide are used to prepare a variety of integrated optics devices. A typical waveguide structure includes a silicon (Si) substrate having three layers of silicon dioxide ($SiO_2$), each doped to produce a desired index of refraction and reflow properties. The first layer on the silicon substrate, called the lower cladding layer, typically comprises 10–15 microns of thermally grown, undoped $SiO_2$ formed by high-pressure oxidation of the silicon substrate surface (HIPOX). The second $SiO_2$ layer, called the core layer, is doped with phosphorus (P) and having an index of refraction larger than that of the lower cladding layer. The third, or upper layer, overlies the core layer, has a thickness also in the range of 10–15 microns, and is typically doped with Boron (B) and Phosphorous to have an index of refraction close to that of the lower cladding layer. A higher refractive index of the core relative to the cladding layers is required to support waveguiding conditions for propagation of light in the core.

One of the problems encountered in the fabrication of photonic lightwave circuits (PLCs) based on waveguides is optical birefringence caused by biaxial (vertical and horizontal) strain exerted by the cladding layers on the core. The strain arises from the difference in thermal expansion coefficients of the cladding layers and core and the Si substrate. The result is anisotropic index of refraction, i.e. different indices of refraction for the TE and TM modes of optical waveguides. In practical multiplexing devices this difference may shift the response spectrum between the TE and TM modes of individual channels by as much as 0.3 nm. This effect, known as birefringence, can be very significant in dense wavelength division multiplexing (WDM) where the channel separation may be smaller than 0.4 to 0.8 nm.

In typical PLC structures, cladding layers comprise layers having low level boron dopant concentrations. For example, U.S. Pat. No. 5,506,925 discloses a cladding layer doped with 2.5% P and 4% B to produce a desired index of refraction and also proposes irradiation to induce a reduction in birefringence in the waveguide structure. Without such irradiation, thermally induced stress in the waveguide structure core may be as high as −75 MPa, resulting in birefringence induced splitting between TE and TM modes of 0.25–0.3 nm which in some commercial applications is undesirably high.

In PLC structures using such B and P doped cladding layers, the as-deposited doped upper cladding layer is not yet glass of high optical quality. Formation of glass requires annealing the doped cladding layer at high temperature, typically between 900 and 950° C. The softening temperature for undoped silicon dioxide is considerably higher, as much as 1100° C. As the annealing temperature is approached the doped silicon dioxide softens and the strain in the core layer becomes negligibly small. However, upon cooling the glass becomes rigid again. The difference in thermal expansion coefficients between the glass and the Si substrate gives rise to strain and, therefore, undesirable optical birefringence.

SUMMARY OF THE INVENTION

The present invention seeks to address and alleviate the above problems without use of irradiation.

According to the present invention, an optical waveguide structure comprises an optical waveguide core surrounded by lower and upper cladding layers of silicon dioxide on a silicon substrate. The core comprises phosphorous doped silicon dioxide, advantageously having a stoichiometric composition to reduce optical loss. The respective refractive indices of the core, the lower cladding layer and the upper cladding layer enable waveguiding of optical signals introduced into said core. The upper cladding layer, and in one embodiment each of the upper and lower cladding layers, comprises silicon dioxide doped with phosphorous and about 9% or greater of boron such that birefringence induced optical shift between TE and TM modes of propagation of an optical signal in said core layer does not exceed about 0.15 nm, and preferably is reduced to below about 0.06 nm.

Desirably, the thermal coefficient of expansion of each of said upper and lower claddings layer approximates that of said silicon substrate. Advantageously, the waveguide structure is so formed that there is close to zero residual stress in the waveguide core. To address this objective, the dopant relationships in the cladding around the core are such that residual tensile stress at least partly compensates compressive strain in the core. Alternatively, the lower cladding layer may comprise a HIPOX layer, preferably having a pedestal on which the waveguide core is positioned so that the upper cladding layer surrounds the top and side surfaces of the core and extends beyond the lower surface of the core along the side surfaces of the HIPOX layer pedestal. In such a structure, the upper cladding layer can be structured to provide a desired index of refraction (e.g. 1.446) and to have a residual tensile strain (e.g. about 8 Mpa) to compensate compressive stress in the core and enabling birefringence as low as about 0.01 nm to be obtained.

In general, waveguide structures embodying the invention may include a core comprising annealed phosphorous doped silicon dioxide having a phosphorous content of about 8%, in conjunction with at least an upper cladding layer comprising annealed silicon dioxide doped with boron in the approximate range 9% to 11% and with phosphorous in the approximate range 2.5% to 3.5%. In a particular embodiment, the core and cladding layers are formed using low temperature PECVD TEOS processing.

DETAILED DESCRIPTION OF EMBODIMENTS OF THE INVENTION

Figure 1:
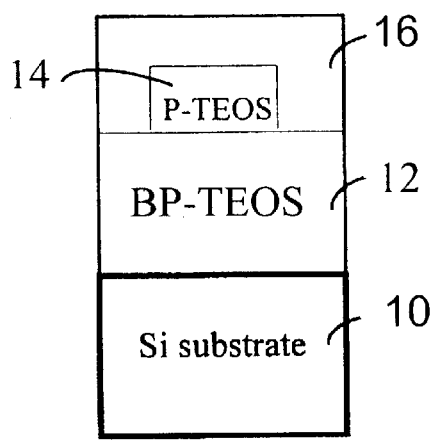
FIG. 1 is a diagrammatic cross section of a preferred optical waveguide structure embodying the invention.

An optical waveguide structure embodying the present invention may be structured as depicted in FIG. 1. A silicon dioxide lower cladding layer 12 typically about 10–15 microns thick is formed on a silicon substrate 10. An elongated silicon dioxide waveguide core 14, typically about 7×5 microns (W×H) is enclosed between the lower cladding layer 12 and a silicon dioxide upper cladding layer 16, also typically about 10–15 microns thick. The lower and upper cladding layers 12 and 16 are doped with boron and phosphorous whereas the core 14 is doped with phosphorous. Each of the cladding layers 16 and 12 as well as the layer from which the core 14 is formed, may be deposited using low temperature PECVD processing as disclosed in greater detail in copending application Ser. No. 10/047780 filed on the same date as this application, by Henryk Temkin and Rudolf F. Kazarinov, entitled Optical Waveguide Structures and Methods of Fabrication, also assigned to Applied WDM, Inc., the disclosure of which is hereby incorporated by reference in the present application. Each of the cladding layers 14 and 16 and the core layer 12 is annealed after it has been deposited, and when 10 um cladding layers are employed, it is preferable that each is deposited as two successive 5 um thick layers, with annealing after deposition of each deposited layer. The doping concentrations are selected such that the core 14 has a refractive index greater, typically by more than 0.01, than the refractive indices of the lower and upper cladding layers 12 and 14 such that single mode waveguide propagation of optical signals along the core is supported.

A particular advantage of using a TEOS based PECVD process to form the core layer 16 is that TEOS provides a highly stoichiometric composition of silicon dioxide on which the index of refraction of silicon dioxide is dependent. While stoichiometric silicon dioxide has an index of refraction of $n=1.4460$, when measured with 1.55 micron wavelength, non-stoichiometric silicon dioxide exhibits refractive indices from about $n=1.4$ to $n=1.7$, depending on the relative proportions of silicon and oxygen. However, the stoichiometric material has the lowest optical loss. It is the preferred material for the fabrication of the core layer of waveguide structures in carrying out the present invention.

The low deposition temperature of PECVD TEOS makes it possible to incorporate phosphorus with a suitably high concentration. The phosphorus is retained in the as deposited material during a high temperature anneal needed to transform it into high optical quality glass and the high phosphorus content produces glass with a suitably high index of refraction.

Figure 2:
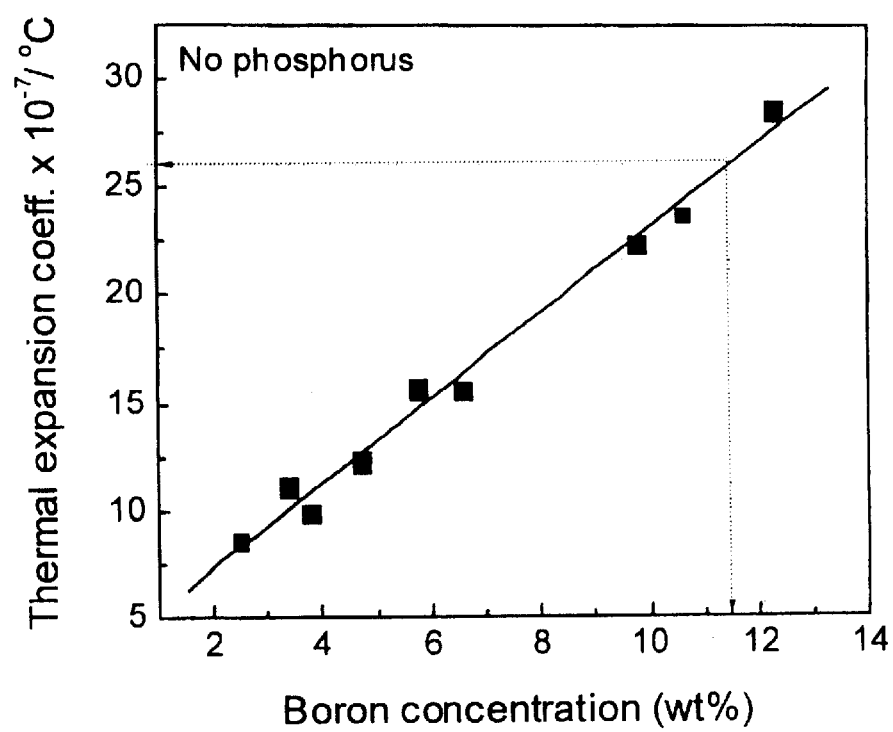
FIG. 2 shows change in the thermal coefficient of expansion (TCE) of bulk glass plotted as a function of boron concentration at room temperature.

FIG. 2 shows the known dependence of the thermal expansion coefficient of bulk (i.e. not deposited on a substrate) glass as a function of boron concentration, see for instance "Optical Materials, A Series of Advance", v. 1, ed. S. Musicant, M. Dekker, New York and Basel, 1990, pp. 176–183 and 193. No phosphorus was added to this material. At a boron concentration of 11.5%, the room temperature thermal expansion coefficient of the doped glass matches that of Si. It is also known that the addition of phosphorus increases the thermal expansion coefficient, at approximately the same rate. It is thus possible to add B and P to match the thermal coefficient of bulk glass to Si.

However, to achieve a cladding layer doped with boron and phosphorous useful in PLC structures having low polarization dependence, preferably approaching zero, it is required that such a layer can be deposited on a Si wafer, have a desired combination of index of refraction and thermal coefficient of expansion, and it must be possible to anneal the as-deposited doped layer to form high quality glass with low optical loss and strain.

Figure 3:
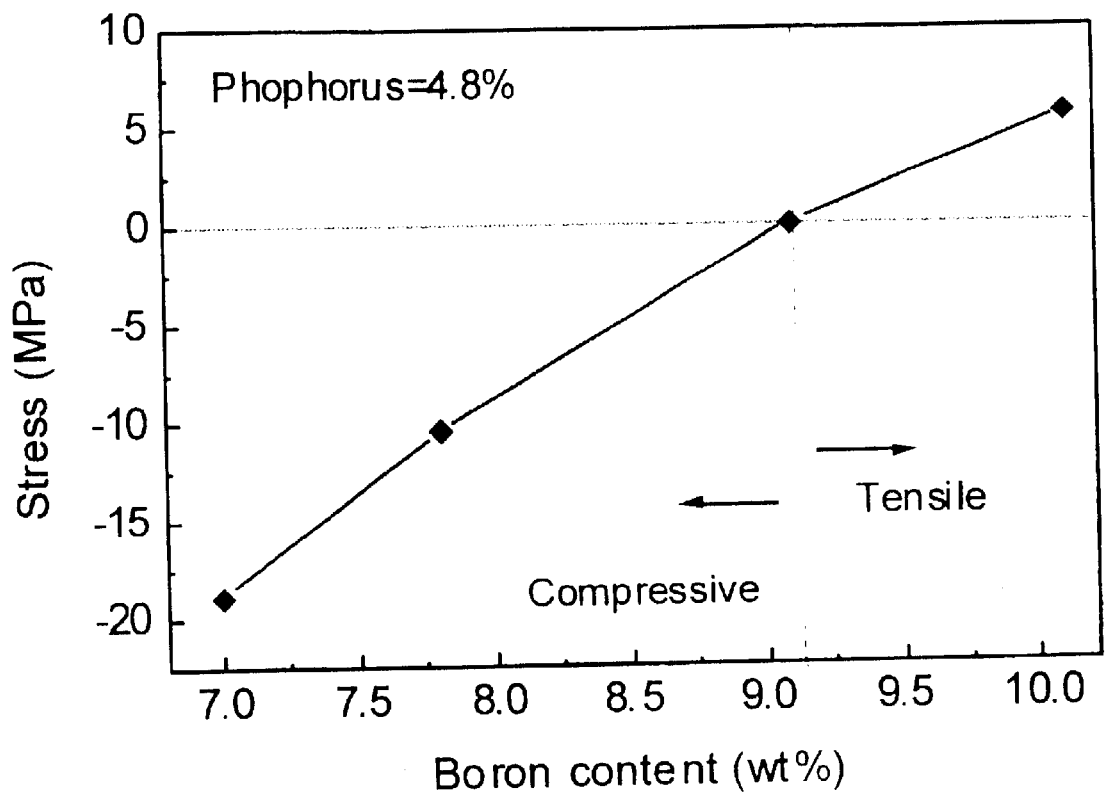
FIG. 3 shows change in stress with boron concentration in silicon dioxide glass layers doped with boron and phosphorous and formed by plasma assisted CVD.

FIG. 3 shows the change in the stress of a 5 micron thick layer of B and P doped silicon dioxide deposited on a silicon substrate as a function of B concentration, with the P concentration kept constant at 4.8%. Each doped layer was prepared using plasma enhanced chemical vapor deposition with tetraethyloxysilane ($Si(OC_2H_5)_4$), a process known as TEOS. Boron and phosphorus were derived from conventional sources, trimethylborate (known as TMB) and trimethylphosphate (known as TMP), respectively. After deposition the doped layers were annealed at 950° C. for 15 min. As shown in FIG. 3, the stress in the deposited layer changes from compressive to tensile at a boron concentration of ~9.1%. At this point the layer is free of stress. The ability to change the sign of the stress is crucial to the design and preparation of substantially birefringence free optical waveguides. However, the index of refraction of the high-boron high-phosphorus layers is ~1.45, measured at a wavelength of 1.55 microns, slightly larger that the ~1.445 desired for waveguides based on P-doped core layers.

Figure 4:
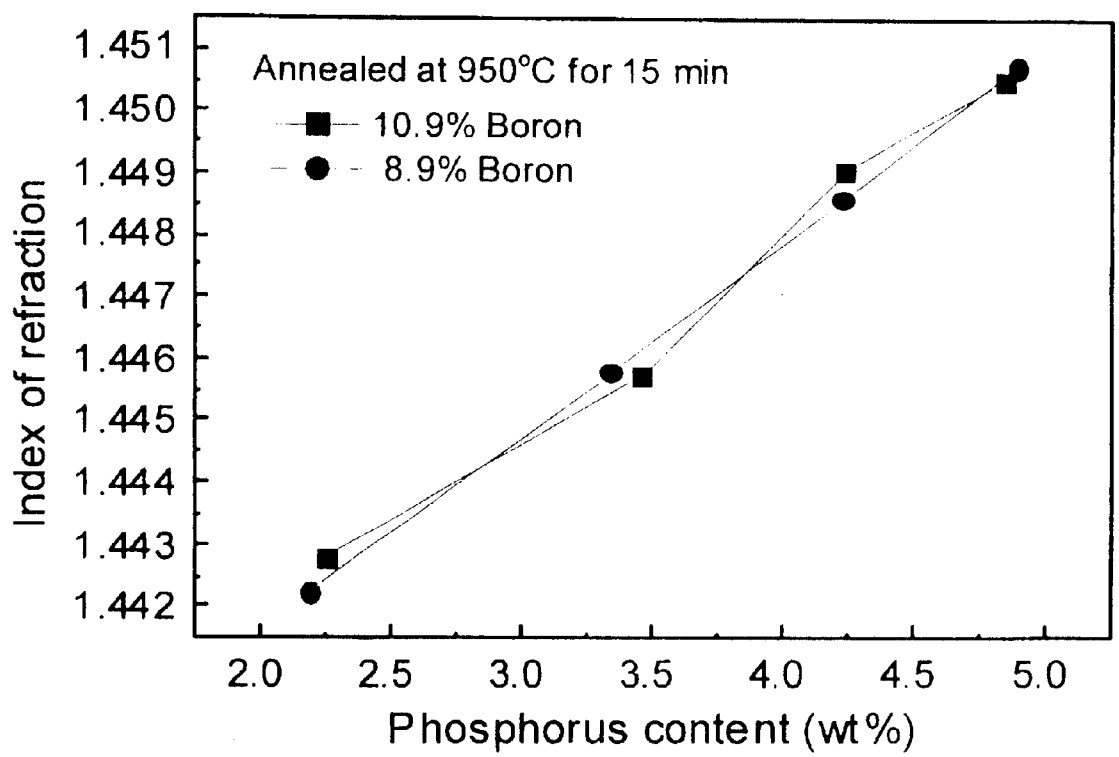
FIG. 4 shows change in index of refraction (RI), measured at 1.55 microns, with phosphorous concentration, for different boron concentrations, in silicon dioxide glass layers doped with boron and phosphorous and formed by plasma assisted CVD; and FIG. 5

Increases in P concentration in the B and P doped silicon dioxide layer increase the index of refraction while, in contrast, increases in B concentration decrease the index of refraction. In order to adjust the index of refraction, and to maintain appropriately low stress, reduction in phosphorus content of a 5 micron thick glass layer comprising B and P doped silicon dioxide was investigated. FIG. 4 shows the index of refraction dependence on the phosphorus content. The index of refraction varied from $n=1.442$ to slightly over 1.45 as the phosphorus content was changed from ~2 to ~5%. For glasses with high boron content of about ~9–10% the preferred range of phosphorus content is between 2.2 and 3.5% (corresponding to a refractive index range of about 1.442 to 1.446). Such glass layers also have been found to change stress from compressive to tensile when boron and phosphorus concentrations are changed. This allows design and manufacture of essentially birefringence free optical waveguides.

Further increases in either the phosphorus or boron concentrations are possible but eventually the material becomes thermodynamically unstable and may not convert to high quality glass in the annealing process. As concentrations of B and P are lowered, biaxial stress and birefringence tend to increase resulting in a lower limit on the useful concentrations of B and P in the doped cladding layers, dependent on the biaxial stress and birefringence that can be tolerated in a given waveguide structure.

Based on the above determinations, optical waveguide structures embodying the invention may be constructed as depicted in FIG. 1 having low birefringence and negligibly small shift in optical response for the TE and TM polarizations. The opposing effects of doping with P and B can be used to form the upper cladding layer 16 of the waveguide structure, so that the index of refraction of the upper cladding layer 16 closely matches that of an undoped silicon dioxide lower cladding layer. Both the upper and lower cladding layers 16 and 12 comprise silicon dioxide doped with P and B such that both layers have the same index of refraction, as well as matching thermal coefficients of expansion, and consequently lowers stress in the cladding layers 16, 12 and in the core 14.

The structure may incorporate 10–15 um thick upper and lower cladding layers 16, 12 each comprising annealed B and P doped silicon dioxide (formed by successively deposited and annealed 5 m layers as previously described), and a 7×5 um core 14 layer comprising annealed P doped silicon dioxide. Suitably, the BP-TEOS lower cladding layer 12 is annealed at about 900–950° C., the P-TEOS core 14 at about 1000° C., and the BP-TEOS upper cladding layer 16 at about 850° C., thereby permitting the geometry of the patterned core 14 to be maintained. The refractive index of each of the upper and lower cladding layers 16, 12 is about 0.01 to 0.014 lower than the refractive index of the core 14 which has a P dopant concentration in the approximate range 8%. The B and P dopant concentrations in the upper and lower cladding layers 16 and 12 are selected such that the resultant stress in those layers (and hence the stress induced in the core 12) is close to zero and preferably slightly tensile (c.f. FIG. 3) to provide birefringence values resulting in optical response shift less than about 0.1 nm and preferably about 0.06 nm or less required for many commercial WDM applications, with a predicted achievable birefringence of no more than 0.02 nm. Alternatively expressed, in optical waveguide structures embodying the invention birefringence induced optical signal intensity difference between TE and TM modes of propagation of an optical signal in the core layer does not exceed about 0.5 db. In general, consistent with these objectives, B doping in the approximate range 9% to 11% and P dopant concentrations in the approximate range 2.5% to 3.5% have been determined as suitable to match the thermal coefficient of expansion of the silicon substrate 10 while permitting the required difference in index of refraction from that of the P doped core 12. In a particular embodiment the upper and lower cladding layers 16 and 12 have an 11% B dopant concentration and a 3.5% P dopant concentration, with a predicted birefringence of about 0.2 nm. In any event, as described above, the B dopant concentration level must result in a deposited layer that does not become thermodynamically unstable during the annealing process to enable conversion of the deposited layers into optical quality, high transparency glass to provide waveguide structures having low levels of birefringence in the desired range as well as low loss.

The optical waveguide structure depicted in FIG. 1 is advantageous in that use of B and P dopant concentrations in the ranges discussed above to provide the desired index of refraction difference from that of the P doped core 14 can be selected such that the core 14 is completely surrounded by upper and lower cladding layers 16 and 12 having thermal coefficients of expansion matched to that of silicon resulting in low to negligible stress in those layers and in the core 12, with residual stress preferably slightly tensile to compensate for the compressive strain in the core 14. By selection of appropriate combinations of boron and phosphorus using the parameters discussed above the thermal expansion coefficient of the upper and lower glass cladding layers can be closely matched to that of the silicon substrate while achieving the required difference in index of refraction between the core and the upper and lower cladding layers to support single mode waveguide propagation of optical signals along the core. The resulting waveguide structure can be designed to exhibit negligibly low birefringence making it particularly suited to fabrication of substantially polarization independent PLCs.

Further, the use of high-boron silicon dioxide doped to form low-stress glass in the upper and lower cladding layers as described with reference to FIG. 1 also substantially reduces and may effectively eliminate the technologically important problem of stress-induced wafer bowing. Such bowing makes wafers unsuitable for high-resolution photolithography.

Figure 5:
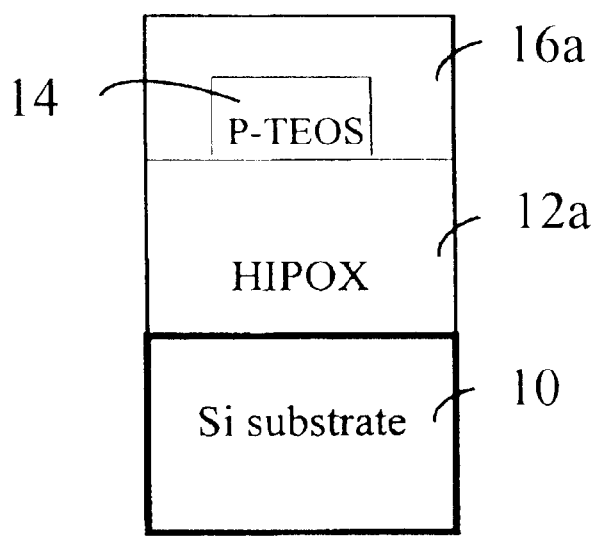
Figure 6:
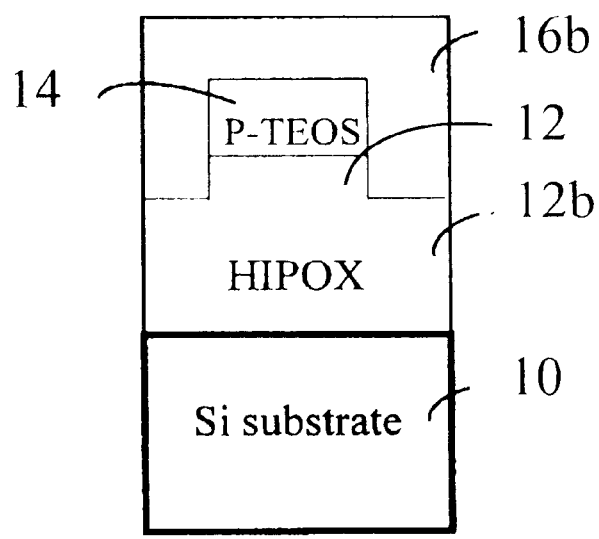
FIG. 6 depicts a diagrammatic cross section of an alternative optical waveguide structure embodying the invention.

FIGS. 5 and 6 depict alternative optical waveguide structures which have manufacturability advantages for commercial applications. In the FIG. 5 structure, the lower cladding layer 12a comprises thermally grown high-pressure silicon dioxide (HIPOX) which is thermally mismatched to the silicon substrate 10. As shown in FIG. 5, a P-TEOS layer 14 is then deposited on the lower cladding layer 12 by introducing reactant gases comprising TEOS and phosphorous, derived from TMP, into the PECVD reactor and heating to about 400–450° C. for a period of about 5 minutes to form a phosphorous doped silicon oxide layer 14 about 5 microns thick. This structure is then annealed at about 1000° C. for about 1 hour to convert the core layer 14 to optical quality transparent glass.

The deposited core layer 14 is then patterned by conventional lithography and dry etching to produce a waveguide core having a desired configuration and suitably having a width and thickness of about 7×5 microns which can support single mode optical transmission along the waveguide core. It is to be understood that two or more waveguide cores having the same or different configurations could be formed in this manner if so desired.

In this structure, the thermally matched (with respect to the silicon substrate 10), upper cladding layer 16a, based on high boron (e.g. 9–11%) and phosphorous (e.g. 2.2–3.5%) doped glass as described above with reference to FIG. 1, surrounds the top and sides of the core 14, thereby reducing stress in the core 14. The upper cladding layer 16a may comprise successively deposited and annealed 5 mm layers, each annealed at about 900–950° C. which is less than the softening temperature of the HIPOX layer 12 so that the patterned geometry of the core 14 may be maintained. Such a structure enables birefringence as low as about 0.15 nm to be achieved which has commercial utility.

However the birefringence induced by thermal mismatch of the lower cladding layer 16b (HIPOX) and the silicon substrate 10 can be significantly reduced or eliminated by modifying the HIPOX lower cladding layer of the structure depicted in FIG. 5 to incorporate a step or pedestal 12b on which the core 14 is located, as depicted in FIG. 6. Consequently, the upper high Boron doped upper cladding layer 16b in FIG. 6 surrounds the top and sides as well as extending below the lower surface of the core 14, further reducing the stress in the core 14. This is achieved by the dry etching used to pattern the core layer extending into the HIPOX layer 12b by about 2–3 microns. In this structure the high boron glass upper cladding layer 16b has boron and phosphor concentrations chosen to provide a residual tensile strain of about 8 MPa, thereby compensating compressive stress in the core 14 while the index of refraction of the upper cladding layer glass measured at wavelength 1.55 m is about 1.446. Such a structure enables birefringence as low as about 0.01 nm. This level of birefringence is acceptable in most commercial applications.

While particular embodiments of the invention have been described above, it is to be appreciated that modifications of the described optical waveguide structures are contemplated within the scope of the appended claims.

What is claimed is:

1. An optical waveguide structure, comprising:
   an optical waveguide core surrounded by lower and upper cladding layers of silicon dioxide on a silicon substrate, said core comprising phosphorous doped silicon dioxide, the respective refractive indices of the core, the lower cladding layer and the upper cladding layer enabling waveguiding of optical signals introduced into said core, and at least said upper cladding layer comprising silicon dioxide doped with phosphorous in the range 2.5% to 3.5% and about 9% to 11% of boron such that birefringence induced optical shift between TE and TM modes of propagation of an optical signal in said core layer does not exceed about 0.15 nm.

2. An optical waveguide structure according to claim 1 wherein said birefringence induced optical signal shift does not exceed about 0.06 nm.

3. An optical waveguide structure according to claim 1 wherein said birefringence induced optical signal shift does not exceed about 0.02 nm.

4. An optical waveguide structure according to claim 1 wherein at least said upper cladding layer has a thermal coefficient of expansion substantially matching that of the silicon substrate.

5. An optical waveguide structure according to claim 1, wherein the upper and lower glass cladding layers are doped with boron and with phosphorous such that tensile stress in said cladding layers compensates compressive strain in the core such that there is a residual tensile stress close to zero in the core.

6. An optical waveguide structure, comprising:
an optical waveguide glass core surrounded by lower and upper glass cladding layers on a silicon substrate, said core comprising annealed phosphorous doped silicon dioxide, the respective refractive indices of the core, the lower cladding layer and the upper cladding layer enabling single mode waveguiding of optical signals introduced into said core, and at least said upper cladding layer comprising annealed silicon dioxide doped with phosphorous in the range 2.5% to 3.5% and about 9% to 11% of boron to provide low residual tensile stress in the core resulting in birefringence induced optical signal shift between TE and TM modes of propagation of an optical signal in said core layer less than about 0.15 nm.

7. An optical waveguide structure, comprising:
an optical waveguide glass core surrounded by lower and upper glass cladding layers on a silicon substrate, said core comprising annealed phosphorous doped silicon dioxide having a higher refractive index than the refractive index of the upper cladding layer and of the lower cladding layer, enabling single mode waveguide propagation of optical signals in said core, and said upper and lower cladding layers each comprising annealed silicon dioxide doped with greater than 9% boron and 2.5% to 3.5% phosphorous such that the temperature coefficient of expansion of each of said upper and lower cladding layers approximates that of the silicon substrate to reduce stress in said core layer close to zero whereby birefringence induced optical signal intensity difference between TE and TM modes of propagation of an optical signal in said core layer is reduced.

8. An optical waveguide structure according to claim 7, wherein the upper and lower cladding layers are doped with boron in the approximate range 9% to 11%.

9. An optical waveguide structure, comprising:
an optical waveguide glass core surrounded by lower and upper glass cladding layers on a silicon substrate, said core comprising annealed phosphorous doped silicon dioxide, and said upper cladding layer comprising silicon dioxide doped with 2.5% to 3.5% phosphorous and more than about 9% boron such that the thermal coefficient of expansion of said upper cladding layer approximates that of said silicon substrate, the indices of refraction of said upper and lower cladding layers each being sufficiently less than that of said core as to enable single mode waveguide propagation of optical signals introduced into said core, and wherein the glass lower cladding layer comprises thermally deposited silicon dioxide and birefringence induced optical signal shift between TE and TM modes of propagation of said optical signal in said core layer does not exceed about 0.15 nm.

10. An optical waveguide structure according to claim 9, wherein said lower cladding layer includes a pedestal on which said core is located, and wherein said upper cladding layer extends beyond the core to the lower cladding layer on opposite sides of said pedestal.

11. An optical waveguide structure according to claim 10, wherein said pedestal height is about 50% of the underlying core thickness.

12. An optical waveguide structure according to claim 11, wherein said birefringence induced optical signal shift is about 0.01 nm.

13. An optical waveguide structure according to claim 10, wherein said birefringence induced optical signal shift is not greater than about 0.15 nm.

14. An optical waveguide structure, comprising:
an optical waveguide glass core surrounded by lower and upper glass cladding layers on a silicon substrate, said core comprising phosphorous doped silicon dioxide having a refractive index greater than that of said upper and lower cladding layers to enable single mode waveguide propagation of optical signals introduced into said core, and said upper cladding layer comprising silicon dioxide doped with phosphorous and more than about 9% boron and 2.5% to 3.5% phosphorous such that tensile stress in said cladding layers compensates compressive stress in said core such that residual stress in the core is tensile and close to zero, to enable birefringence induced optical signal shift between TE and TM modes of propagation of an optical signal in said core layer not exceeding about 0.06 nm.

15. An optical waveguide structure according to claim 14, wherein tensile stress in at least said upper cladding layer is about 8 Mpa.

16. An optical waveguide structure, comprising:
an optical waveguide glass core surrounded by lower and upper glass cladding layers on a silicon substrate, said core comprising annealed silicon dioxide doped with about 8% phosphorous, and said upper and lower cladding layers each comprising annealed silicon dioxide doped with boron in the approximate range 9% to 11% and with phosphorous in the range about 2.5% to 3.5% such that the thermal coefficient of expansion of each of said upper and lower claddings layer approximates that of said silicon substrate and that the indices of refraction of said upper and lower cladding layers is each sufficiently less than that of said core as to enable single mode waveguide propagation of optical signals along said core with birefringence induced optical signal shift between TE and TM modes of propagation of said propagated optical signal in said core layer not exceeding about 0.06 nm.

17. An optical waveguide structure according to claim 16, wherein there is residual tensile stress close to zero stress in said core.

18. An optical waveguide structure according to claim 16, wherein tensile stress in said cladding layers at least partly compensates compressive strain in the core.

19. An optical waveguide structure according to claim 16, wherein tensile stress in at least said upper cladding layer is about 8 Mpa.

20. An optical waveguide structure according to claim 16 wherein the index of refraction of said core is greater than about 0.01 greater than the index of refraction of the upper cladding layer and of the lower cladding layer.

21. An optical waveguide structure, comprising:

an optical waveguide glass core surrounded by lower and upper glass cladding layers on a silicon substrate, said core comprising annealed phosphorous doped silicon dioxide having a phosphorous content of about 8%, and said upper and lower cladding layers each comprising annealed silicon dioxide doped with boron in the approximate range 9% to 11% and with phosphorous in the range 2.5% to 3.5% such that the thermal coefficient of expansion of each of said upper and lower claddings layer approximates that of said silicon substrate, residual stress in the core is tensile and close to zero stress, and the index of refraction of the core relative to the indices of refraction of said upper and lower cladding layers enabling single mode waveguide propagation of optical signals along said core with birefringence induced optical signal shift between TE and TM modes of propagation of said propagated optical signal in said core layer not exceeding about 0.06 nm.

22. An optical waveguide structure according to claim 21, wherein said residual stress in the core results from compressive strain in the core being compensated by tensile stress in said cladding layers.

23. An optical waveguide structure according to claim 22, wherein tensile stress in at least said upper cladding layer is about 8 Mpa.

* * * * *